United States Patent
Flosbach et al.

(10) Patent No.: US 6,268,021 B1
(45) Date of Patent: Jul. 31, 2001

(54) BINDER VEHICLE AND COATING MEDIUM COMPOSITION AND THE USE THEREOF FOR MULTI-LAYER COATING

(75) Inventors: Carmen Flosbach; Friedrich Herrmann; Walter Schubert; Dirk Schild, all of Wuppertal (DE)

(73) Assignee: Herberts GmbH, Wuppertal (DE)

( * ) Notice: Subject to any disclaimer, the term of this patent is extended or adjusted under 35 U.S.C. 154(b) by 0 days.

(21) Appl. No.: 09/208,999

(22) PCT Filed: Jun. 5, 1997

(86) PCT No.: PCT/EP97/02917

§ 371 Date: Dec. 11, 1998

§ 102(e) Date: Dec. 11, 1998

(87) PCT Pub. No.: WO97/47674

PCT Pub. Date: Dec. 18, 1997

(30) Foreign Application Priority Data

Jun. 12, 1996 (DE) ............................................... 196 23 371

(51) Int. Cl.[7] .............................. B05D 1/36; B05D 7/16; C08G 18/00
(52) U.S. Cl. ...................... 427/407.1; 524/591; 524/601; 525/124; 525/127; 525/440; 525/454; 528/48; 528/75; 528/274; 528/288
(58) Field of Search ..................... 524/591, 592, 524/601; 427/407.1, 409, 388.4; 525/127, 124, 131, 440, 454; 528/48, 75, 274, 288

(56) References Cited

U.S. PATENT DOCUMENTS

| | | | |
|---|---|---|---|
| 3,477,996 | * | 11/1969 | Formaini . |
| 4,076,766 | * | 2/1978 | Simms .................................. 260/850 |
| 4,329,490 | * | 5/1982 | Williams et al. ....................... 560/90 |
| 4,331,717 | * | 5/1982 | Wenzel et al. ..................... 427/389.7 |
| 4,373,059 | * | 2/1983 | Patzschke et al. ................... 524/761 |
| 4,382,114 | * | 5/1983 | Hohlein et al. ...................... 427/409 |
| 4,489,135 | * | 12/1984 | Drexler et al. .................... 428/423.1 |
| 4,565,730 | * | 1/1986 | Poth et al. ......................... 427/407.1 |
| 4,578,426 | * | 3/1986 | Lenz et al. ............................ 525/131 |
| 4,732,960 | * | 3/1988 | Rasshofer et al. ...................... 528/75 |
| 4,851,460 | * | 7/1989 | Stranghoner et al. ............... 523/407 |
| 4,880,867 | * | 11/1989 | Gobel et al. ......................... 524/507 |
| 5,017,673 | * | 5/1991 | Balatan .................................. 528/59 |
| 5,326,820 | | 7/1994 | Hoffmann et al. ................... 525/123 |
| 5,342,882 | * | 8/1994 | Gobel et al. ......................... 524/832 |
| 5,552,184 | * | 9/1996 | Klostermann et al. .............. 427/391 |
| 5,601,878 | * | 2/1997 | Kranig et al. ..................... 427/407.1 |
| 5,658,617 | * | 8/1997 | Gobel et al. ..................... 427/385.5 |
| 5,681,622 | * | 10/1997 | Vogt-Birnbrich et al. ........ 427/407.1 |
| 5,688,859 | * | 11/1997 | Schneider et al. ................... 524/591 |
| 5,760,128 | * | 6/1998 | Baltus et al. ......................... 427/409 |

FOREIGN PATENT DOCUMENTS

| | | |
|---|---|---|
| 4024204 A1 | 2/1992 | (DE) . |
| 4135571 A1 | 5/1993 | (DE) . |
| 4421823 A1 | 1/1996 | (DE) . |
| 0206072 B2 | 12/1986 | (EP) . |
| 0242714 A2 | 10/1987 | (EP) . |
| 0314447 A2 | 5/1989 | (EP) . |

* cited by examiner

Primary Examiner—Diana Dudash
(74) Attorney, Agent, or Firm—Pillsbury Madison & Sutro LLP

(57) ABSTRACT

A binder vehicle composition which is suitable for coating media, containing:

A) 20 to 77% by weight of one or more binder vehicles based on oligomeric or polymeric polyol compounds with a hydroxyl number of 80 to 300, an acid number of 0 to 30, a number average molecular weight (Mn) of 500 to 10,000, and a glass transition temperature of −20 to +70° C.;

B) 77 to 20% by weight of crosslinking agents based on aliphatic and/or cycloaliphatic polyisocyanates;

C) 3 to 20% by weight of oligo- or polyesters, which contain carboxyl groups, as catalyst resins, which have an acid number of 210 to 300 mg KOH/g and a number average molecular weight (Mn) of 420 to 3000;

and one or more organic solvents and/or water.

17 Claims, No Drawings

BINDER VEHICLE AND COATING MEDIUM COMPOSITION AND THE USE THEREOF FOR MULTI-LAYER COATING

This application is the national phase of international application PCT/EP97/02917 filed Jun. 5, 1997 which designated the U.S.

FIELD OF THE INVENTION

This invention relates to solvent-containing or aqueous binder vehicles and thermally hardening solvent-containing or aqueous coating media and the use thereof for the production of lacquer coatings, particularly multi-layer coatings, for example as a base lacquer and preferably as a clear or covering lacquer.

BACKGROUND OF THE INVENTION

Coating media are known in which resins which contain hydroxyl groups are crosslinked with polyisocyanates. Thus EP-A-0 541 604 describes coating media based on polycondensation and polyaddition products which contain hydroxyl groups and which are crosslinked with polyisocyanates, wherein the binder vehicle which contains hydroxyl groups is composed of at least one polyester and/or one alkyd resin and at least one polyacrylate resin, wherein the polyacrylate resin is produced, at least in part, in the presence of the polyester which is contained as a proportion. Customary organometallic compounds, such as dibutyltin laurate, are employed as catalysts here. Substances of this type are not toxicologically harmless, and moreover often give rise to yellowing. EP-A-0 036 975 describes a two-component lacquer which is composed of a polyester polyol which is low in aromatics, and optionally of a hydroxy-functional polyacrylate resin, which are crosslinked with polyisocyanates. Zinc octoate, which in combination with UV absorbers often results in lacquers which exhibit pronounced yellowing, is used as the catalyst here. EP-A-0 206 072 describes polyacrylate copolymers which are synthesised in the presence of polyester polyols. These binder vehicles can be crosslinked with polyisocyanates or melamine resins. Acids, such as paratoluenesulphonic acid for example, are described as catalysts. The use of acids of this type also frequently results in pronounced yellowing in clear lacquers.

SUMMARY OF THE INVENTION

The object of the present invention is to provide a coating medium which is particularly suitable for high-solids coatings which are highly resistant to chemicals and are free from yellowing, and which result in a very good covering lacquer condition, a reduced run-off tendency and a very high resistance to bubble formation, and with which the disadvantages described above are avoided.

It has been shown that this object can be achieved by a binder vehicle composition or by coating media which, in contrast to known coating media, employ strongly acidic resins as catalysts.

The present invention therefore relates to a binder vehicle composition, which contains:
A) 20 to 77% by weight of one or more binder vehicles based on one or more oligomeric or polymeric polyol compounds with a hydroxyl number of 80 to 300 mg KOH/g, preferably 120 to 200 mg KOH/g, an acid number of 0 to 30 mg KOH/g, preferably 0 to 15 mg KOH/g, a number average molecular weight (Mn) of 500 to 10,000, preferably 1000 to 5000, and a glass transition temperature of −20 to +70° C., preferably 0 to 50° C.;
B) 77 to 20% by weight of one or more crosslinking agents based on aliphatic and/or cycloaliphatic polyisocyanates;
C) 3 to 20% by weight of one or more oligo- or polyesters, which contain carboxyl groups, as catalyst resins, which have an acid number of 210 to 300 mg KOH/g, preferably 220 to 270 mg KOH/g, and a number average molecular weight (Mn) of 420 to 3000, preferably 700 to 2000;

wherein the sum of components A) to C) is 100% by weight in each case; and one or more organic solvents and/or water.

The present invention further relates to aqueous and non-aqueous coating media which contain the binder vehicle composition according to the invention as well as customary lacquer additives, where said customary lacquer additives may also be pigments and/or extenders.

The binder vehicle compositions and coating media according to the invention contain, as component A), one or more polyol compounds as binder vehicles. Preferred examples thereof include hydroxy-functional (meth)acrylic copolymers, polyesters and/or polyester-modified (meth)acrylic copolymers, although other polyols, such as hydroxy-functional polyurethanes and polyethers for example, are also suitable.

These (meth)acrylic copolymers can be produced by polymerisation using customary methods, such as bulk-, solution- or pearl polymerisation for example. These different polymerisation methods are well known to one skilled in the art and are described, for example, in: Houben-Weyl, Methoden der organischen Chemie, 4th Edition, Volume 14/1, pages 24 to 255 (1961). The solution polymerisation method is preferred for the production of the (meth)acrylic copolymers which are used in the coating medium according to the invention. In this method, the solvent is placed in the reaction vessel and heated to boiling temperature, and the monomers are continuously added, optionally in admixture with radical initiators, over a defined period. The polymerisation temperatures are between 60° C. and 160° C. for example, and are preferably between 120° C. and 150° C. The initiators and monomers can also be added separately or at different times during the polymerisation process, however.

The (meth)acrylic monomers which are used can be non-functionalised, hydroxy-functionalised or carboxy-functionalised. Moreover, other ethylenically unsaturated monomers can also be used. The expression "(meth)acrylic" is synonymous with "acrylic and/or methacrylic".

Examples of non-functionalised (meth)acrylates include long-chain, branched or unbranched, unsaturated monomers such as alkyl (meth)acrylates which comprise $C_8$–$C_{18}$ chains in their alkyl part, such as 2-ethylhexyl (meth)acrylate, octyl (meth)acrylate, 3,5,5-trimethylhexyl (meth)acrylate, decyl (meth)acrylate, dodecyl (meth)acrylate, hexadecyl (meth)acrylate, octadecyl (meth)acrylate, lauryl acrylate-1214, isobornyl (meth)acrylate or 4-tert.-butyl cyclohexyl methacrylate for example. Other examples include short- or medium-chain, branched or unbranched unsaturated monomers, such as alkyl (meth)acrylates which comprise $C_1$–$C_7$ chains in their alkyl part, e.g. methyl (meth)acrylate, ethyl (meth)acrylate, propyl (meth)acrylate, butyl (meth)acrylate, isopropyl (meth)acrylate, isobutyl (meth)acrylate, tertiary butyl (meth)acrylate, pentyl (meth)acrylate, hexyl (meth)acrylate or cyclohexyl (meth)acrylate.

Another suitable non-functionalised polymerisable component is a monovinyl aromatic compound. This preferably contains 8 to 10 carbon atoms per molecule. Examples of suitable compounds include styrene, vinyltoluenes, α-methylstyrene, chlorostyrene, o-, m- or p-methylstyrene, 2,5-dimethylstyrene, p-methoxystyrene, p-tert.-butyl styrene, p-dimethylaminostyrene, p-acetamidostyrene and m-vinylphenol. Vinyltoluenes, and styrene in particular, are preferably used. It is also possible to use the vinyl ester of versatic acid (Trade Name VEOVA 10 of Shell AG).

Examples of other suitable non-functionalised ethylenically unsaturated monomers include the alkyl esters of maleic, fumaric, tetrahydrophthalic, crotonic, isocrotonic, vinylacetic and itaconic acids, such as the corresponding methyl, ethyl, propyl, butyl, isopropyl, isobutyl, pentyl, amyl, isoamyl, hexyl, cyclohexyl, 2-ethylhexyl, octyl, 3,5, 5-trimethylhexyl, decyl, dodecyl, hexadecyl, octadecyl and octadecenyl esters for example.

The (meth)acrylic monomers which are used may comprise primary or secondary hydroxy functions. Examples of monomers comprising primary hydroxy functions include hydroxyalkyl esters of α,β-unsaturated carboxylic acids, such as acrylic acid and/or methacrylic acid, which comprise a primary OH group and a $C_2$–$C_3$ hydroxyalkyl radical, e.g. hydroxyethyl (meth)acrylate, as well as hydroxyalkyl esters of α,β-unsaturated carboxylic acids, such as acrylic acid and/or methacrylic acid, which comprise a primary OH group and a $C_4$–$C_{18}$ hydroxyalkyl radical, e.g. butanediol monoacrylate, hydroxyhexyl acrylate, hydroxyoctyl acrylate and the corresponding methacrylates, and the reaction products of hydroxyethyl (meth)acrylate with caprolactone.

Examples of monomers which comprise secondary OH functions include hydroxypropyl (meth)acrylate, addition products of glycidyl (meth)acrylate and saturated, short-chain acids comprising $C_1$–$C_3$ alkyl radicals, e.g. acetic acid or propionic acid, the reaction products of glycidyl (meth) acrylate with saturated, branched or unbranched fatty acids comprising $C_4$–$C_{20}$ alkyl radicals, e.g. butanoic acid, caproic acid, lauric acid, palmitic acid, stearic acid or arachidonic acid, as well as addition products of glycidyl esters of highly branched monocarboxylic acids (the glycidyl ester of versatic acid is obtainable under the trade name Cardura E) with unsaturated COOH-functional compounds, such as acrylic or methacrylic acid, maleic acid, crotonic acid, and the addition products of Cardura E with unsaturated anhydrides such as maleic anhydride for example. The reaction of acrylic acid or methacrylic acid with the glycidyl ester of a carboxylic acid comprising a tertiary α-carbon can be effected before, during or after the polymerisation reaction.

Examples of suitable monomers which contain carboxyl groups include unsaturated carboxylic acids, such as acrylic, methacrylic, itaconic, crotonic, isocrotonic, aconitic, maleic and fumaric acids, semi-esters of maleic and fumaric acids, as well as β-carboxyethyl acrylate and addition products of hydroxyalkyl esters of acrylic acid and/or (meth)acrylic acid with carboxylic acid anhydrides, such as phthalic acid mono-2-methacryloyloxyethyl ester and semi-esters of maleic anhydride, which are formed by the addition of saturated aliphatic alcohols such as ethanol, propanol, butanol and/or isobutanol for example.

It is also possible to use a small amount of (meth)acrylic monomers comprising terminal tert.-amino groups. Examples of monomers such as these include tert.-aminomethyl (meth)acrylate and tert.-aminopropyl (meth) acrylate.

In addition, small proportions of monomers which comprise least two polymerisable, olefinically unsaturated double bonds can also be used. The proportion of these monomers is preferably less than 5% by weight with respect to the total weight of monomers. Examples of compounds of this type include hexanediol di(meth)acrylate, ethylene glycol di(meth)acrylate, butanediol di(meth)acrylate, hexamethylene bis(meth)acrylate, trimethylolpropane tri(meth) acrylate and similar compounds.

Siloxane-modified monomers can also be used, such as trimethylsiloxyethyl (meth)acrylate and trimethylsiloxypropyl (meth)acrylate for example.

Examples of radical initiators which can be used for the production of the (meth)acrylic copolymers include dialkyl peroxides such as di-tert.-butyl peroxide or di-cumyl peroxide; diacyl peroxides such as di-benzoyl peroxide or dilauroyl peroxide; hydroperoxides such as cumene hydroperoxide or tert.-butyl hydroperoxide; peresters such as tert.-butyl perbenzoate, tert.-butyl perpivalate, tert.-butyl per-3,5,5-trimethylhexanoate or tert.-butyl per-2-ethylhexanoate; peroxydicarbonates such as di-2-ethylhexyl peroxydicarbonate or dicyclohexylperoxydicarbonate; perketals such as 1,1-bis-(tert.-butyl-peroxy)-3,5,5-trimethyl-cyclohexane or 1,1-bis-(tert.-butylperoxy)cyclohexane; ketone peroxides such as cyclohexanone peroxide or methyl isobutyl ketone peroxide; and azo compounds such as 2,2'-azo-bis-(2,4-dimethyl-valeronitrile), 2,2'-azo-bis-(2-methylbutyronitrile), 1,11-azo-bis-cyclohexanecarbonitrile or azo-bis-isobutyronitrile; and initiators which cleave C—C bonds, such as benzpinacol derivatives for example.

The polymerisation initiators are generally added, for example, in an amount of 0.1 to 4% by weight, with respect to the monomers weighed in.

Chain transfer agents can be used in conjunction to regulate the molecular weight, particularly during the preferred solution polymerisation. Examples thereof include mercaptans, thioglycolic acid esters, chlorohydrocarbons, cumene and dimeric alpha-methylstyrene.

The (meth)acrylic copolymers described above should have a hydroxyl number of 80 to 300 mg KOH/g, preferably 120 to 200 mg KOH/g, an acid number of 0 to 30 mg KOH/g, preferably 0 to 15 mg KOH/g, a number average molecular weight of 500 to 10,000, preferably 1000 to 5000, and a glass transition temperature of −20 to +70° C., preferably 0 to 50° C. The quantitative proportions of the various monomers and additives are selected for production in the manner which is familiar to one skilled in the art so that the desired specifications are achieved for the molecular weight, OH and acid numbers, and glass transition temperature.

Polyesters can also be used as binder vehicle component A).

Production of the polyesters which are contained in the coating media according to the invention is effected by the customary procedure, which is familiar to one skilled in the art, comprising the polycondensation of mono-, di- and/or tricarboxylic acids or anhydrides thereof and mono-, di-, and/or tri- or polyols, for example in the presence of customary esterification catalysts and at elevated temperatures, e.g. 180–250° C., and in the melt for example. Entraining agents such as xylene may also optionally be used.

Example of suitable monocarboxylic acids for the production of the polyesters include aromatic carboxylic acids such as benzoic acid, tert.-butylbenzoic acid and hexahydrobenzoic acid, saturated fatty acids such as 2-ethylhexanoic acid, isononanoic acid or coconut oil fatty acid, hydrogenated industrial fatty acids or fatty acid mixtures, decanoic acid, dodecanoic acid, tetradecanoic acid, stearic acid, palmitic acid or docosanoic acid, unsaturated fatty acids such as soya oil fatty acid, sorbic acid, peanut oil fatty acid, conjuene fatty acids, tall oil fatty acid, safflower oil fatty acid and mixtures of these or other monocarboxylic acids.

Examples of suitable carboxylic acids or anhydrides of higher functionality include phthalic acid (anhydride), isophthalic acid, terephthalic acid, tetrahydrophthalic acid (anhydride), hexahydrophthalic acid (anhydride), 1,3- and 1,4-clohexane-dicarboxylic acid, maleic acid (anhydride), succinic acid (anhydride), fumaric acid, adipic acid, sebacic acid, azelaic acid, dimeric fatty acids, trimeric fatty acid, trimellitic acid (anhydride), pyromellitic acid (anhydride) and mixtures of these or other acids.

Examples of suitable monohydric alcohols include aliphatic and cycloaliphatic alcohols such as n-hexanol, cyclohexanol, decanol, dodecanol, tetradecanol, octanol and octadecanol, natural and synthetic fatty alcohols such as lauryl alcohol, Ocenol 110/130 (manufactured by Henkel) and mixtures of these and other alcohols. These monohydroxy-functional alcohols may also be provided with carboxy functions. Suitable examples of the latter include dimethylolpropionic acid, lactic acid, malic acid, tartaric acid. epsilorhydroxycaproic acid, castor oil fatty acid, or derivatives such as epsilon-caprolactone for example.

Examples of suitable polyhydric alcohols include aliphatic and cycloaliphatic diols and polyols such as ethylene glycol, 1,2- and 1,3-propylene glycol, 1,3-, 1,4-, or 2,3-butanediol, 1,6-hexanediol, 2,5-hexanediol, trimethylhexanediol, diethylene glycol, triethylene glycol, hydrogenated bisphenols, 1,4-cyclohexanediol, 1,4-cyclohexane-dimethanol, neopentyl glycol, tricyclodecanediol, 1,4-butanediol, trimethylolpropane, glycerol, pentaerythritol, trimethylpentanediol, dipentaerythritol and mixtures of these or other polyhydric alcohols.

Monoaminohydroxy- and/or monoaminocarboxy compounds are also suitable. Examples thereof include aminoethanol, 2-aminopropanol, diethanolamine, aminoacetic acid or 6-aminohexanoic acid.

Examples of suitable organic solvents for the production of the polyester resins include N-methylpyrrolidone, ketones such as methyl ethyl ketone, methyl isobutyl ketone or acetone, aromatic compounds such as xylene, esters such as butyl acetate or mixtures of these or other solvents.

Polyester-modified (meth)acrylic copolymers can also be used as binder vehicle component A). These binder vehicles are produced by copolymerisation by a radical mechanism, in the presence of a polyester resin. The polyesters described above as component A), or similar polyesters, can be used as polyesters, for example. The monomers can be the same as those described above for the production of (meth)acrylic copolymers for component A). The amount of monomer is adjusted so that the desired specifications are achieved as regards molecular weight, ratio of OH groups, OH number and acid number.

Production is effected, for example, as solution polymerisation by a radical mechanism, in the presence of a radical initiator such as those which were described above for the production of the (meth)acrylic copolymers which can be used according to the invention. Polymerisation initiators are generally added in an amount of 0.1 to 4% by weight with respect to the monomers weighed in, for example. The monomers can also be added separately or at different times during polymerisation, however. A procedure may be used, for example, in which the total amount or a partial amount of the polyester resin is placed in the reaction vessel, optionally dissolved in an organic solvent, and radical polymerisation is then effected in the body of this polyester resin or of the polyester resin solution. The substances used as solvents can be those which are also used for the synthesis of the polyester resin. Other suitable solvents can also be used, however. Suitable organic solvents are the customary lacquer solvents such as those which can also be used subsequently in the coating medium according to the invention, for example: glycol ethers such as ethylene glycol dimethyl ether; glycol ether esters such as ethyl glycol acetate, butyl glycol acetate, 3-methoxy-n-butyl acetate, butyl diglycol acetate or methoxypropyl acetate; esters such as butyl acetate, isobutyl acetate or amyl acetate; and ketones such as methyl ethyl ketone, methyl isobutyl ketone, diisobutyl ketone, cyclohexanone or isophorone. Aromatic hydrocarbons such as xylene, Solvesso 100 (registered Trade Mark for a mixture of aromatic hydrocarbons with a boiling range of 155 to 185° C.) and aliphatic hydrocarbons can also be used in admixture with the aforementioned solvents. Chain transfer agents can also be used in conjunction here in order to regulate the molecular weight.

Polyisocyanates are used as component B) of the coating media according to the invention. Examples of polyisocyanates which can be used according to the invention include cycloaliphatic and aliphatic polyisocyanates such as 1,2-propylene diisocyanate, 2,3-butylene diisocyanate, tetraethylene diisocyanate, 1,6-hexamethylene diisocyanate, 2,2,4-tri-methylene diisocyanate, 1,12-dodecane diisocyanate, cyclohexane 1,3- and 1,4-diisocyanates, 1-isocyanato-3,3,5-trimethyl-5-isocyanato-methylcyclohexane (=isophorone diisocyanate; IPDI) or mixtures of these compounds.

Apart from these simple isocyanates, isocyanates are also suitable which contain hetero atoms in the radical linking the isocyanate groups. Examples thereof include polyisocyanates which comprise carbodiimide groups, allophanate groups, isocyanurate groups, urethane groups, acylated urea groups or biuret groups.

For example, modification products, which comprise biuret, isocyanurate or urethane groups, of the above simple polyisocyanates are particularly suitable for the invention, particularly tris-(6-isocyanatohexyl)-biuret or low molecular weight polyisocyanates which comprise urethane groups, such as those which can be obtained by the reaction of IPDI, used in excess, with simple polyhydric alcohols of molecular weight range 62 to 300, particularly with trimethylolpropane. Any mixtures of said polyisocyanates can also of course be used.

Other suitable polyisocyanates include the known prepolymers which comprise terminal isocyanate groups, such as those which can be obtained in particular by the reaction of the aforementioned simple polyisocyanates, mainly diisocyanates, with sub-stoichiometric amounts of organic compounds which comprise at least two groups which are capable of reacting with isocyanate groups. The compounds which are preferably used here are those which comprise a total of at least two amino groups and/or hydroxyl groups and which have a number average molecular weight (Mn) of 300 to 10,000, preferably 400 to 6000. The corresponding polyhydroxyl compounds are preferably used, e.g. the hydroxypolyesters, hydroxypolyethers and/or acrylate resins which contain hydroxyl groups and which are known in the art in polyurethane chemistry.

In these known prepolymers, the ratio of isocyanate groups to hydrogen atoms which are reactive to NCO ranges from 1.05 to 10:1, preferably from 1.1 to 3:1, wherein the hydrogen atoms preferably originate from hydroxyl groups. The type and quantitative ratios of the starting materials used for the production of the NCO prepolymers are generally selected so that NCO prepolymers a) have an average NCO functionality of 2 to 4, preferably 2 to 3, and b) have a number average molecular weight (Mn) of 500 to 10,000, preferably 800 to 4000.

It is also possible to use copolymers of the vinylically unsaturated monoisocyanate dimethyl-m-isopropylene-benzyl isocyanate, as described, amongst other topics, in DE-A-41 37 615.

The isocyanate groups of the polyisocyanates used are optionally partially or completely capped. Customary capping agents can be used, e.g. 1,2-propanediol, dimethyl malonate, diethyl malonate, ethyl acetoacetate and/or butanone oxime, as well as other capping agents which are familiar to one skilled in the art. Examples of other suitable capping agents include compounds which only contain a single amine, amide, imide, lactam, thio or hydroxyl group. Examples thereof include aliphatic or cycloaliphatic alcohols such as n-butanol, isopropanol, tert.-butanol, furfurol, 2-ethylhexanol, cyclohexanol, phenols, cresol or tert.-butyl phenols, dialkylamino alcohols such as dimethylaminoethanol, oximes such as methyl ethyl ketoxime, acetone oxime, cyclohexanone oxime or acetophenone oxime, lactams such as epsilon-caprolactam or pyrrolidone-2, imides such as phthalimide or N-hydroxymaleinimide, hydroxyalkyl esters, hydroxamic acids and esters thereof, N-alkylamides such as methylacetamide, imidazoles such as 2-methylimidazole, and pyrazoles such as 2,3-dimethylpyrazole. Mixtures of these capping agents can also be used, however.

The proportion of polyisocyanate crosslinking agent is preferably selected so that 0.5 to 2.0 isocyanate groups are allotted to each hydroxyl group of the binder vehicle component.

Strongly acidic oligo- and/or polyesters which contain carboxyl groups are used as component C). The synthesis of said component C) substantially corresponds to the synthesis of polyester component A), and includes the starting materials, such as alcohols and acids, which can be used there and which were cited as examples. In order to attain the very high acid numbers, it is often necessary to incorporate acidic groups by an additional reaction step after polycondensation. This is effected, for example, by the reaction of hydroxy functions of the polyester with carboxylic acid anhydrides, such as hexahydrophthalic anhydride for example, with the formation of a semi-ester. Examples of carboxylic acid anhydrides which are suitable for addition to hydroxyl-functional polyesters or oligoesters include the anhydrides of aliphatic, cycloaliphatic and, less preferably, aromatic saturated and/or unsaturated di- and polycarboxylic acids, such as the anhydrides of phthalic acid, tetrahydrophthalic acid, hexahydrophthalic acid, succinic acid, maleic acid, itaconic acid, glutaric acid, trimellitic acid and pyromellitic acid and halogenated or alkylated derivatives thereof. The anhydrides which are preferably used are those of phthalic acid, tetrahydrophthalic acid or hexahydrophthalic acid, as well as 5-methyl-hexahydrophthalic anhydride. In order to obtain oligomeric component C), which has a highly acidic functionality, di-, tri- and polyols can also be reacted on their own with anhydrides. Trimethylolpropane, ditrimethylolpropane, pentaerythritol and dipentaerythritol are particularly preferred here.

The hydroxy- and/or carboxy functions of components A) and C) can be subjected to chain extension with a lactone. Lactones (cyclic esters) add to hydroxyl and/or carboxyl groups, whereupon the ring is opened and a new terminal hydroxyl or carboxyl group is formed. Epsilon-caprolactone is an example of a lactone which is particularly preferred. Examples of other lactones include gamma-butyrolactone and lactones such as beta-priolactone, delta-valerolactone, delta-butyrolactone, zeta-enantholactone and eta-caprylolactone. Lactones of this type may be substituted: examples thereof include 6-methyl-epsilon-caprolactone, 3-methyl-epsilon-caprolactone, 5-methyl-epsilon-caprolactone, 5-phenol-epsilon-capro-lactone, 4-methyl-delta-valerolactone, 3,5-dimethyl-epsilon-caprolactone, and mixtures thereof. The reaction with the lactone can be carried out directly following the synthesis of the resin, for example, i.e. following the synthesis of the poly(meth) acrylic polymer and/or of the polyester. The reaction is conducted at elevated temperature, for example at temperatures up to 100° C. The reaction can be carried out with stirring, for example, and for up to 10 hours for example.

The binder vehicles and coating media according to the invention may exist in water-thinnable form. This can be effected, for example, by partial or complete neutralisation of the acidic groups of components A) and/or C) with bases and/or by the addition of emulsifiers. If an aqueous emulsion is to be prepared, the solvent which is used during the production of components A) and C) is substantially removed. This can be effected by distillation, optionally under vacuum for example. The resin concentrate which is obtained, which is formed from components A) and C) and which has a high solids content of 90% by weight for example, can then be neutralised, via the acidic groupings of component C), with a customary base e.g. ammonia or with an organic amine e.g. triethylamine. The neutralised resin concentrate of component C) then functions as an emulsifier resin. The neutralised resin concentrate which is obtained can be emulsified in water. This can be effected, for example, by employing intensive stirring and by employing heating if necessary, for example to temperatures of 30 to 80° C., e.g. 50° C.

The resin concentrate can also be emulsified with a customary, ionic or non-ionic, emulsifier. This is effected, for example, by homogenising the resin concentrate and the non-ionic emulsifier, optionally with heating to temperatures of 30 to 80° C., e.g. 60° C. A mixture of this type can be emulsified continuously or batch-wise in a customary homogenisation device. Examples thereof include rotor/stator homogenisers which operate at speeds of rotation of 8000 to 10,000 revolutions per minute for example. The emulsifiers are used in amounts of 3 to 30% by weight with respect to the resin concentrate, for example.

The binder vehicle compositions according to the invention can be formulated in the usual manner to form aqueous coating media. This is generally effected by adding solvents or water.

Suitable organic solvents for the production of coating media, for example lacquers, are those which can also be used for the production of the individual components. Examples of solvents of this type include organic solvents such as aliphatic and aromatic hydrocarbons, for example toluene or xylene, mixtures of aliphatic and/or aromatic hydrocarbons, esters and ethers. These are customary lacquer solvents.

Customary additives may be added for the production of aqueous or non-aqueous coating media, such as those additives which are customary in the lacquer sector for example. Examples of additives such as these include pigments, for example transparent or covering colour-imparting pigments such as titanium dioxide or carbon black, and effect pigments such as metal flake pigments and/or pearl gloss pigments.

Other examples of additives include extenders such as french chalk and silicates, plasticisers, stabilisers, and flow enhancers such as silicone oils. The coating media which are produced from the binder vehicles according to the invention can be adjusted to the desired viscosity by correspondingly regulating the addition of solvents and/or water and/or additives.

Hardening of coatings produced from the coating media according to the invention can be effected over a wide temperature range from 20° C. to 180° C. for example, preferably in the range between 80° C. and 150° C.

The coating media which are produced from the binder vehicles according to the invention are suitable for coatings which adhere to a multiplicity of substrates, such as wood, textiles, plastics, glass, ceramics, plaster, cement and particularly metal for example.

The coating media can also be used in a multi-coat process. For example, they can be applied to customary primers, base lacquers, primer surfacers, or to covering lacquers which are already present.

One particularly preferred area of use for the binder vehicles according to the invention is the provision of coating media for lacquer coatings which have a high resistance to bubble formation whilst exhibiting very good resistance to run-off at the same time.

Thus the present invention also relates to processes for the production of coatings on various substrates, in which a coating medium which is produced from the binder vehicles according to the invention is applied to the substrate, whereupon it is hardened and dried. The present invention also relates to the use of the binder vehicle compositions according to the invention, particularly in covering lacquers or clear lacquers.

In each case, films are obtained with the coating media produced from the binder vehicles according to the invention which exhibit very good resistance to chemicals, very good resistance to run-off, very good resistance to bubble formation and a good covering lacquer condition with a very high processing solids content.

Application of the coating media according to the invention can be effected in the usual manner, for example by dipping, spraying or brushing, or by an electrostatic route.

DETAILED DESCRIPTION OF THE PREFERRED EMBODIMENTS

The following examples serve to explain the invention. All parts (pts.) are quoted as parts by weight.

EXAMPLE 1
Production of a Polyester Oligomer 336.7 pts. trimethylolpropane, 366.8 pts. adipic acid and 197 pts. hexanediol were esterified at 180° C. to 230° C. in the melt, to an acid number of 20, with 5 pts. hypophosphorous acid in 2 litre three-necked flask fitted with a stirrer, separator trap, thermometer and reflux condenser.

The batch was subsequently condensed under vacuum to an acid number less than 1.5.

The product which was obtained in this manner had a stoving residue of 94.5% (1 hour at 150° C.), a viscosity of 3200 mPa.s (100%), a hydroxyl number of 460 and a Hazen colour of 30.

EXAMPLE 2
Production of a Polyacrylate Resin 200 pts. Solvesso 100 (a mixture of aromatic hydrocarbons) and 20 pts. butyl acetate 98/100 were heated with stirring to 150° C. in a 2 litre three-necked flask fitted with a dropping funnel, stirrer, reflux condenser and thermometer. 25 pts. butanediol monoacrylate, 165 pts. butyl acrylate, 95 pts. ethylhexyl methacrylate, 225 pts. hydroxypropyl methacrylate and a mixture of 10 pts. di-tert.-butyl peroxide and 30 pts. tert.-butyl peroctoate were subsequently added over a period of 5 hours. Polymerisation was continued for 6 hours under reflux. The product obtained was diluted with 130 pts. butyl acetate 98/100 and had a stoving residue (1 hour at 150° C.) of 64.3%, a viscosity of 210 mPa.s and a Hazen colour of 20.

EXAMPLE 3
Production of a Polyester Oligomer Acrylate

100pts. of the polyester oligomer from Example 1, 100 pts. Solvesso 100 (a mixture of aromatic hydrocarbons) and 20 pts. butyl acetate 98/100 were heated with stirring to 150° C. in a 4 litre three-necked flask fitted with a dropping funnel, stirrer, reflux condenser and thermometer. 25 pts. butanediol monoacrylate, 165 pts. butyl acrylate, 95 pts. ethylhexyl methacrylate, 225 pts. hydroxypropyl methacrylate and a mixture of 10 pts. di-tert.-butyl peroxide and 30 pts. tert. -butyl peroctoate were subsequently added over a period of 5 hours. The batch was subsequently polymerised for 6 hours under reflux. The product obtained had a stoving residue (1 hour at 150° C.) of 73.8%, a viscosity of 2850 mPa.s and a Hazen colour of 40.

EXAMPLE 4
Production of a COOH-Functional Polyester 1000 pts. of the polyester oligomer prepared as in Example 1 were mixed with 878 pts. hexahydrophthalic anhydride in a 4 litre three-necked flask fitted with a stirrer, reflux condenser and thermometer, and were esterified at 80° C. to a constant acid number.

The carboxyl-functional resin had a stoving residue (1 hour at 150° C.) of 83.6%, a viscosity of 4450 mPa.s, an acid number of 320 mg KOH/g solid resin and a Hazen colour of 50.

Production of Lacquers

EXAMPLE 5
Production of Multi-Layer Coatings 21 pts. of a commercially available phthalate, 24 pts. of a mixture of commercially available light stabilisers (HALS and benztriazole derivatives in a ratio of 1:1), 23 pts. of a 1% solution in xylene of commercially available silicone oils (flow enhancers and wetting agents) and 180 parts of a solvent mixture comprising butyl diglycol acetate, ethoxypropyl acetate, butyl glycol acetate and high-boiling aromatic hydrocarbons in a ratio of 13:10:12:65 were added to 409 pts. of the resin solution from Example 2 whilst stirring continuously.

30 pts. of an 82% solution in xylene/butyl acetate (1:1) of an aliphatic isocyanurate polyisocyanate were homogeneously stirred into 100 pts. of this solution. This clear lacquer was used as described below for the production of a multi-layer coating.

Body panels which had been pre-coated with a commercially available cathodically depositable electro-dip lacquer (CDL) (18 µm) as used for the mass-production lacquer coating of automobiles, and with a commercially available primer surfacer (35 µm) were coated with a commercially available, water-thinnable metallic base lacquer to give a dry coat thickness of 15 µm, and were pre-dried for 6 minutes at 80° C. Immediately afterwards, the clear lacquer described above was applied wet-into-wet by spraying to give a dry coat thickness of 35 µm, and after pre-drying for 5 minutes at room temperature was stoved for 20 minutes at 140° C. (object temperature).

EXAMPLE 6

The procedure was analogous to Example 5, except that 0.3 pts. of a 10% solution in xylene of dibutyltin laurate were additionally added to the clear lacquer solution.

EXAMPLE 7

The procedure was analogous to Example 5, except that 8 pts. of the acidic polyester from Example 4 were also added to the clear lacquer solution.

| | Assessment of the clear lacquers | | |
|---|---|---|---|
| Clear lacquer | 5 | 6 | 7 |
| Covering lacquer condition | good | good | very good |
| Run-off tendency Runs at greater than | 33 μm coat thickness | 35 μm coat thickness | 44 μm coat thickness |
| Self-colour of the stoved film | colourless | very slightly yellow | colourless |
| Acid-resistance (10% $H_2SO_4$) | good | good | excellent |
| Pendulum hardness (oscillations) | 111 | 123 | 141 |

We claim:

1. A binder vehicle composition, containing:
   A) 20 to 77% by weight of one or more binder vehicles selected from one or more oligomeric or polymeric polyol compounds with a hydroxyl number of 80 to 300 mg KOH/g, an acid number of 0 to 30 mg KOH/g, a number average molecular weight (Mn) of 500 to 10,000, and a glass transition temperature of −20 to +70° C.;
   B) 77 to 20% by weight of one or more crosslinking agents selected from aliphatic and/or cycloaliphatic polyisocyanates;
   C) 3 to 20% by weight of one or more oligo- or polyesters, which contain carboxyl groups, as catalyst resins, which have an acid number of 210 to 300 mg KOH/g and a number average molecular weight (Mn) of 420 to 3000; wherein the sum of components A) to C) is 100% by weight; and one or more organic solvents and/or water.

2. A coating medium containing the binder vehicle composition according to claim 1, as well as customary lacquer additives.

3. A binder vehicle composition according to claim 1, wherein the polyol compound of component A) is a hydroxy-functional poly(meth)acrylate, a hydroxy-functional polyester and/or a hydroxy-functional polyester-modified poly(meth)acrylate.

4. A binder vehicle composition according to claim 1, wherein the polyisocyanates of component B) are present in the form of isocyanurates.

5. A binder vehicle composition according to claim 1, wherein the polyisocyanates of component B) are completely or partially capped.

6. A binder vehicle composition according to claim 1, wherein comprising organic solvents and are free from water.

7. A binder vehicle composition according to claim 1, wherein comprising water and optionally organic solvents.

8. A process for the multi-layer coating of a substrate, wherein a covering lacquer coat or a base lacquer are applied to a substrate, which may be pre-coated, and are overcoated with a clear lacquer coat and stoved, wherein a coating medium according to claim 2 is applied as the covering lacquer coat, as the base lacquer coat and/or as the clear lacquer coat.

9. A process according to claim 8, characterised in that coating layer is stoved at temperatures of 80 to 150° C.

10. A process for using a coating medium according to claim 2, comprising
    adding the coating medium as a pigment-containing covering lacquer or as a clear lacquer which is pigment-free or which contains at least one member selected from the group consisting of transparent pigments and colorants.

11. A binder vehicle composition according to claim 4, wherein the polyisocyanates of component B) include the trisisocyanurate of hexamethylene diisocyanate.

12. A coating medium according to claim 2, wherein the polyol compound of component A) is a hydroxy-functional poly(meth)acrylate, a hydroxy-functional polyester and/or a hydroxy-functional polyester-modified poly(meth)acrylate.

13. A coating medium according to claim 2, wherein the polyisocyanates of component B) are present in the form of isocyanurates.

14. A coating medium according to claim 13, wherein the polyisocyanates of component B) include the trisisocyanurate of hexamethylene diisocyanate.

15. A coating medium according to claim 2, wherein the polyisocyanates of component B) are completely or partially capped.

16. A coating medium according to claim 2, wherein the medium contains organic solvents and is free from water.

17. A coating medium according to claim 2, wherein the medium contains water and optionally organic solvent.

* * * * *